(12) United States Patent
George (10) Patent No.: US 10,062,068 B1
(45) Date of Patent: Aug. 28, 2018

(54) CHECKOUT WORKSTATION

(71) Applicant: SYMBOL TECHNOLOGIES, LLC, Lincolnshire, IL (US)

(72) Inventor: Sherry George, Leonia, NJ (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/670,835

(22) Filed: Aug. 7, 2017

(51) Int. Cl.
| | |
|---|---|
| *G06K 15/00* | (2006.01) |
| *G06Q 20/20* | (2012.01) |
| *G06K 7/10* | (2006.01) |
| *A47F 9/04* | (2006.01) |
| *G07G 1/00* | (2006.01) |

(52) U.S. Cl.
CPC ............. *G06Q 20/208* (2013.01); *A47F 9/04* (2013.01); *G06K 7/1096* (2013.01); *G06K 7/1097* (2013.01); *G07G 1/0045* (2013.01)

(58) Field of Classification Search
CPC ....... G06Q 30/06; G06Q 20/20; G07G 1/0054
USPC ......................................... 235/383
See application file for complete search history.

(56) References Cited

U.S. PATENT DOCUMENTS

| | | | | |
|---|---|---|---|---|
| 5,155,345 A | * | 10/1992 | Ito ........................... | A47F 9/046 235/383 |
| 7,909,248 B1 | * | 3/2011 | Goncalves ........... | G07G 1/0063 235/375 |
| 2003/0146280 A1 | * | 8/2003 | Acosta ............... | G06K 7/10693 235/454 |
| 2010/0059589 A1 | * | 3/2010 | Goncalves ......... | G06K 9/00771 235/383 |

* cited by examiner

*Primary Examiner* — Ahshik Kim
(74) *Attorney, Agent, or Firm* — Yuri Astvatsaturov (57) ABSTRACT

In an embodiment, the present invention is a method of compiling a register for processing a transaction. The method includes: providing a scanner having a housing with a first and second side that are opposite each other; providing a data capture device that is configured to capture data contained in a target being swiped past the housing; providing a controller operably connected to the data capture device, and operable to maintain the register and identify a direction of the target being swiped; adding an item associated with the target to the register by swiping the target past the housing and the data capture device in a first direction from the first side to the second side; and removing the item from the register by swiping the target past the housing and the data capture device in a second direction from the second side to the first side.

9 Claims, 6 Drawing Sheets

CHECKOUT WORKSTATION

BACKGROUND OF THE INVENTION

Checkout workstations, such as those at retail venues, are typically used during the purchase process to register and pay for the picked item (also referred to as "products"). Commonly, these workstations include a scanner operable to detect indicia (e.g., a barcode depicting a Universal Product Code) associated with an item and a controller operable to act upon the detection of the indicia. While in many instances, the workstations are operated by clerks who assist customers through the checkout process, in some cases the workstations may also be configured a self-checkout lane operated by the customers directly.

For imaging-based checkout workstations, an imager having a field of view (FOV) is used to optoelectrically capture the indicia. This is also referred to as "scanning an item." In particular, an item bearing the indicium is positioned within the scanner's FOV and an image of that indicium is captured. Upon capture, the information encapsulated in the indicium is decoded and the item associated with the indicium is added to the running tally (also referred to as a "register") that is later used to determine the total amount of money owed by the customer.

Although this process of adding items to the register is relatively easy, there are instances where an item, after having been added, needs to be removed from the register. This can happen when, for example, the indicium is presented to the scanner more times than there are items associated with that indicium, when a clerk incorrectly enters the total number of items associated with a scanned indicium, or when a customer no longer wants an item after it has already been scanned. In these instances, the clerk (or the customer in case of a self-checkout workstation) is required to manually interact with the workstation's interface to remove the unwanted items. This can be cumbersome, time-consuming, and may require the assistance of other store personnel, like another clerk, supervisor, manager, etc.

Accordingly, there is a need for improved devices, systems, and methods associated with checkout workstations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment the present invention is a point of sale (POS) workstation that includes a housing; a window supported by a portion of the housing, the portion having a first side and a second side, the first side being opposite to the second side; an imaging assembly positioned within the housing, the imaging assembly configured to capture, through the window, at least one image of a target being swiped past the window; and a controller configured. The controller is configured to identify the target; maintain a register; identify a direction of the target being swiped; add an item associated with the target to the register in response to the direction being from the first side to the to the second side; and remove the item from the register in response to the direction being from the second side to the to the first side.

In another embodiment, the present invention is a method of compiling a register for processing a transaction. The method includes the steps of: providing a scanner having a housing and a window supported by a portion of the housing, the portion having a first side and a second side, the first side being opposite to the second side; providing an imaging assembly within the housing, the imaging assembly being configured to capture, through the window, at least one image of a target being swiped past the window; providing a controller operable to identify the target, maintain the register, and identify a direction of the target being swiped; adding an item associated with the target to the register by swiping the target past the window in a first direction from the first side to the second side; and removing the item from the register by swiping the target past the window in a second direction from the second side to the first side.

In yet another embodiment, the present invention is a method of compiling a register for processing a transaction. The method includes the steps of: providing a scanner having a housing with a first side and a second side, the first side being opposite to the second side; providing a data capture device within the housing, the data capture device being configured to capture data contained in a target being swiped past the housing; providing a controller operably connected to the data capture device, and operable to maintain the register and identify a direction of the target being swiped; adding an item associated with the target to the register by swiping the target past the housing and the data capture device in a first direction from the first side to the second side; and removing the item from the register by swiping the target past the housing and the data capture device in a second direction from the second side to the first side.

Figure 1:
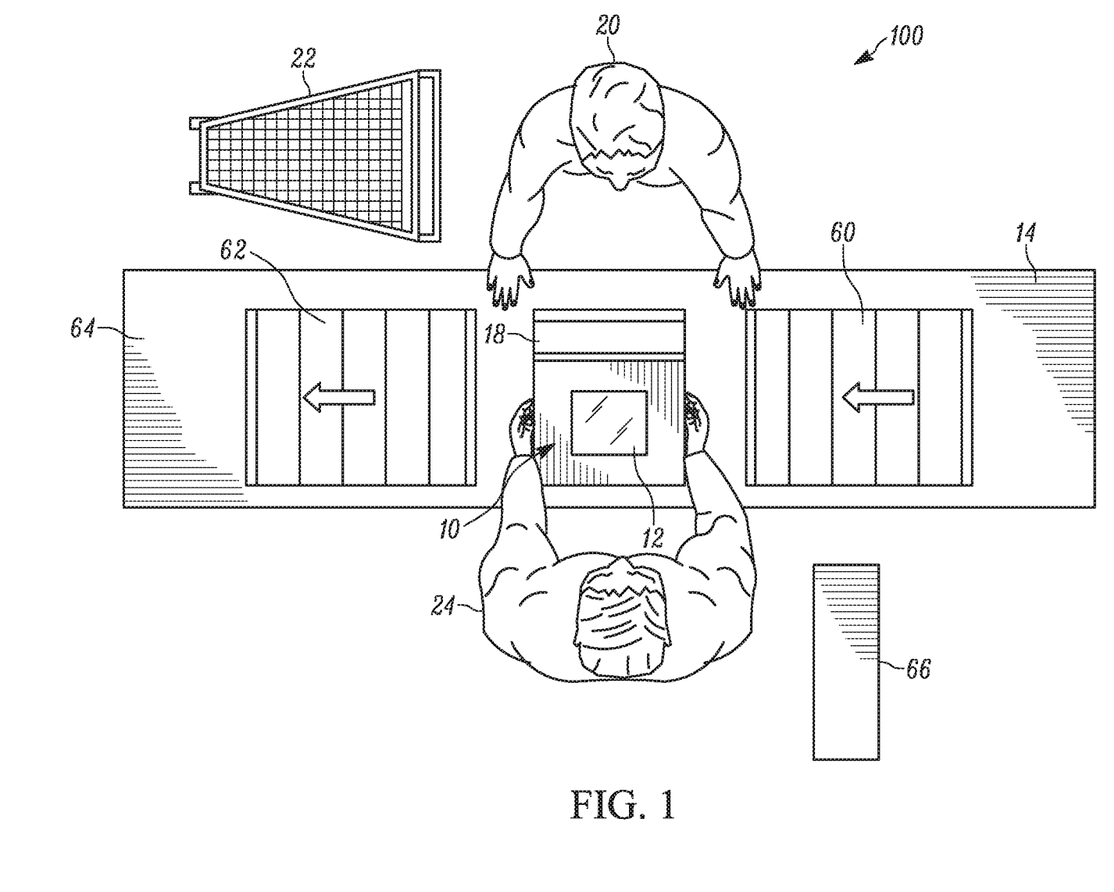
FIG. 1 is a top plan view of one embodiment of a checkout system in accordance with this invention.
Figure 2:
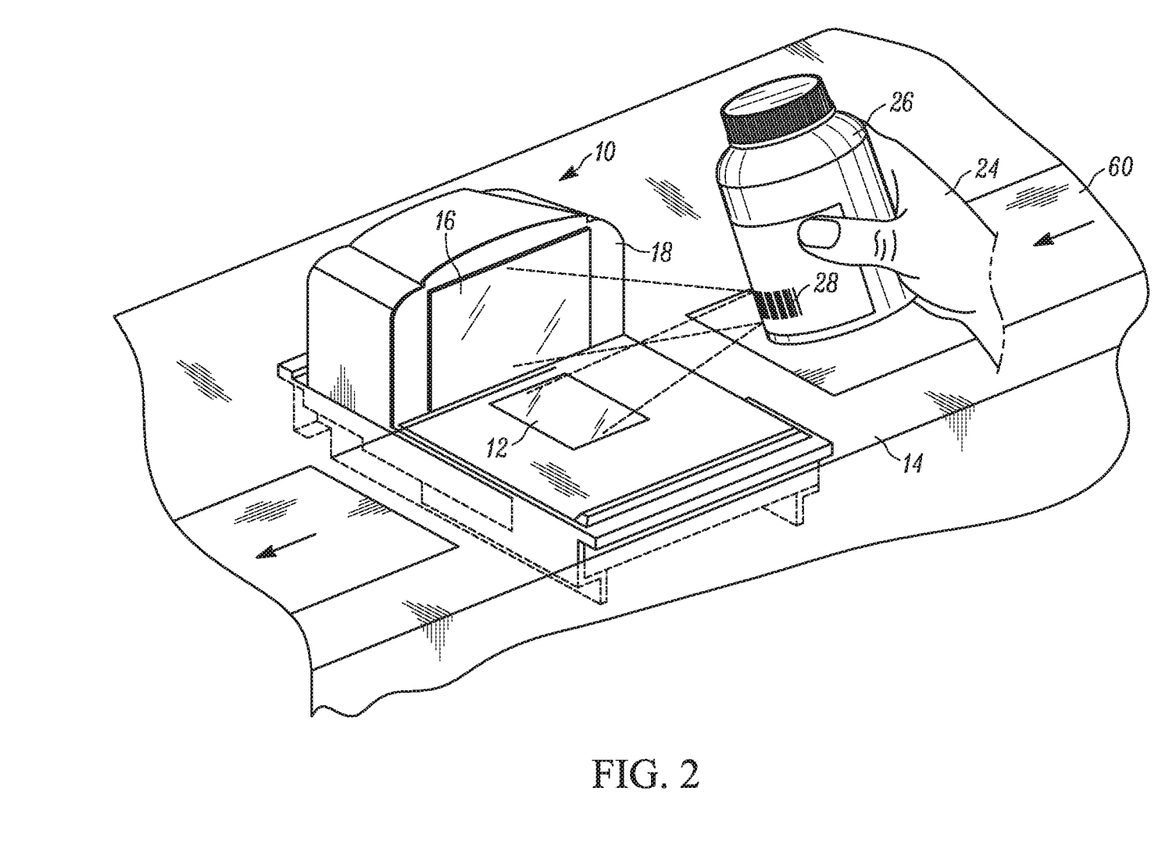
FIG. 2 is a broken-away perspective view of the system of FIG. 1, as seen from the viewpoint of a clerk.
Figure 3:
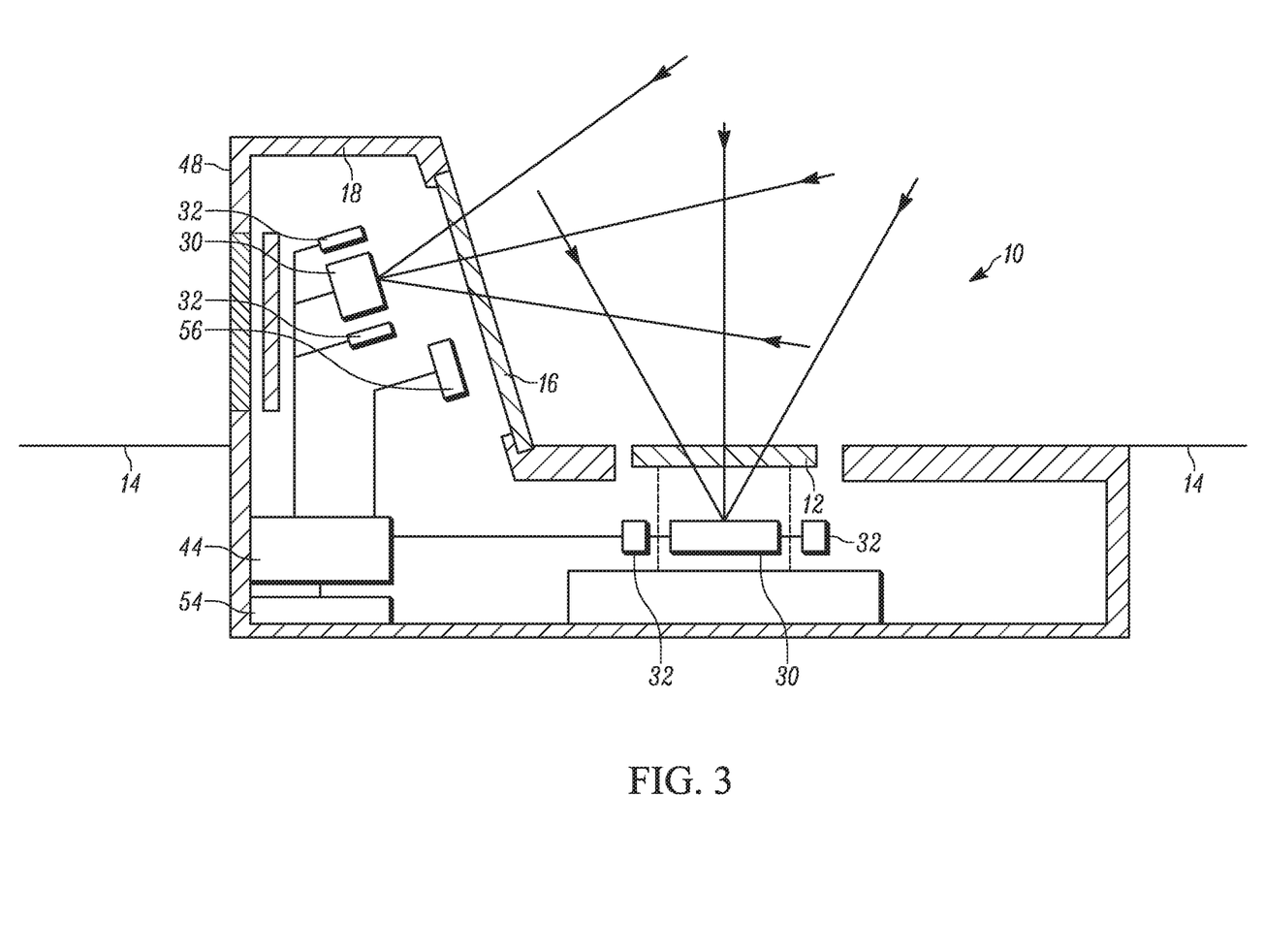
FIG. 3 is a schematic diagram of various components of the workstation of FIG. 1.

Referring now to FIG. 1, shown therein is a system 100 that includes a dual window, bi-optical, point-of-transaction workstation 10 used by retailers at a checkout counter to process transactions involving the purchase of products 26 (see FIG. 2) bearing an identifying target/indicium, such as the UPC symbol 28. As best seen in FIGS. 2-3, the workstation 10 includes an overall housing and has a generally horizontal window 12 elevated, or set flush with, a countertop 14, and a vertical or generally vertical, i.e., tilted, (collectively referred to as "upright" hereinafter) window 16 set flush with, or recessed into, a raised housing portion 18 above the countertop 14. The workstation 10 either rests directly on the countertop 14, or rests in a well formed in the countertop 14. The raised housing portion 18 has a rear wall 48.

Both of the windows 12, 16 are positioned to face and be accessible by a clerk 24 standing at one side of the countertop 14 for enabling the clerk 24 to interact with the workstation 10, and with a cash register 66 to enable the clerk to receive payment for the purchased products. The register 66 may include a debit/credit card reader and a receipt printer to print a receipt. A keypad may also be provided at the register 66 to enable manual entry of information, such as an identifying code for any purchased product not bearing a symbol, by the clerk 24. While the figures illustrate the workstation 10 being operated by a clerk, in other embodiments, the workstation 10 may be used in a "self-checkout" environment where customers handle the processing of the transaction, and thus the workstation would be directed to the customer 20.

An entrance conveyor belt 60 is optionally located at the countertop 14 at one side of the workstation 10, for conveying the products 26 to the workstation 10. The products 26 are typically placed on the entrance conveyor belt 60 by a customer 20 standing at the opposite side of the countertop 14. The customer 20 typically retrieves the individual products for purchase from a shopping cart 22 or basket for placement on the entrance conveyor belt 60. An exit conveyor belt 62 is optionally located at the countertop 14 at the opposite side of the workstation 10, for conveying the products 26 placed on the exit conveyor belt 62 by the clerk 24 away from the workstation 10, preferably to a bagging area 64.

As schematically shown in FIG. 3, a data capture arrangement, advantageously including a plurality of imaging readers, each including a solid-state workstation imager 30 and an illuminator 32, is mounted at the workstation 10, for capturing light passing through either or both windows 12, 16 from a target that can be a one- or two-dimensional symbol, such as a two-dimensional symbol on a product. Each workstation imager 30 can be a solid-state area array, preferably a CCD or CMOS array. Each workstation imager 30 preferably has a global shutter, though other shutters may be used also. Each illuminator 32 is preferably one or more light sources, e.g., one or more surface-mounted, light emitting diodes (LEDs), located at each workstation imager 30 to uniformly illuminate the target. At least one workstation imager 30 along with any of the other optical components may be included in an imaging assembly. As such, as used herein, an imaging assembly includes at least one workstation imager 30.

In use, the clerk 24 processes each product 26 bearing a UPC symbol 28 thereon, past the windows 12, 16 by swiping the product 26 across a respective window, or by presenting the product 26 by holding it momentarily steady at the respective window. The symbol 28 may be located on any visible surface of the product 26 including any of the top, bottom, right, left, front and rear, sides. At least one, if not more, of the workstation imagers 30 are operable to capture the illumination light reflected, scattered, or otherwise returning from the symbol through one or both windows 12, 16 as an image.

As schematically shown in FIG. 3, at least one object sensor 56 is also mounted at the workstation 10 for detecting when each product 26 enters and exits the workstation 10. The object sensor 56 may advantageously include two pairs of infrared (IR) emitters and detectors. In some instances, such as when multiple object sensor 56 are used, it may be possible to determine the direction that each product 26 is being moved in relative to the workstation 10. For example, in an embodiment where a first object sensor 56 is positioned on a first side of the workstation 10 and a second object sensor 56 is positioned on a second side of the workstation, the initial detection of a product by the first object sensor followed by a subsequent detection of the product by the second object sensor could indicate a direction of movement from the first side to the second side of the workstation.

The workstation imagers 30, the associated illuminators 32, and the object sensor 56 are operatively connected to a programmed workstation microprocessor (also referred to as controller) 44 operative for controlling the operation of these and other components. Preferably, the workstation microprocessor 44 is tasked with processing the return light scattered from the target, with decoding the captured target image of the return light, and determining the direction that the product is being moved across the workstation. A memory 54 is operatively bi-directionally connected to the workstation microprocessor 44.

In operation, an active mode for the workstation microprocessor 44 is initiated when the object sensor 56 detects that a product 26 has entered the workstation 10 space. The workstation microprocessor 44 then sends successive command signals to the illuminators 32 to pulse the LEDs for a short time period of, for example, 300 microseconds or less, and successively energizes the workstation imagers 30 to collect light from a target during said time period, also known as the exposure time period. By acquiring a target image during this brief time period, the image of the target can avoid being excessively blurred even in the presence of relative motion between the workstation imagers and the target. A typical array needs about 11 to 33 milliseconds to acquire the entire target image and operates at a frame rate of about 30 to 90 frames per second. The array may have on the order of one million addressable sensors. The active mode ends when the object sensor 56 detects that the product 26 has exited the workstation 10, or when the workstation microprocessor 44 has successfully decoded the target. Once the active mode ends, then a standby mode begins.

Figure 4:
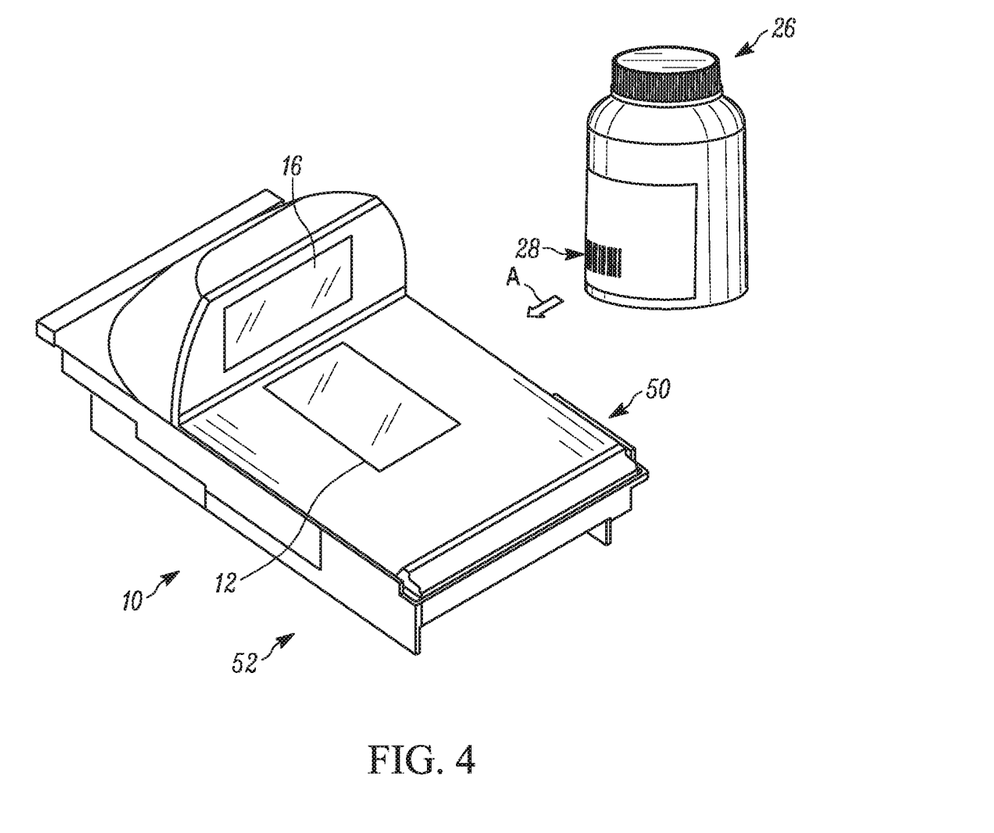
FIG. 4 is a perspective view of a product being added to a transaction register in accordance with an embodiment of the present invention.
Figure 5:
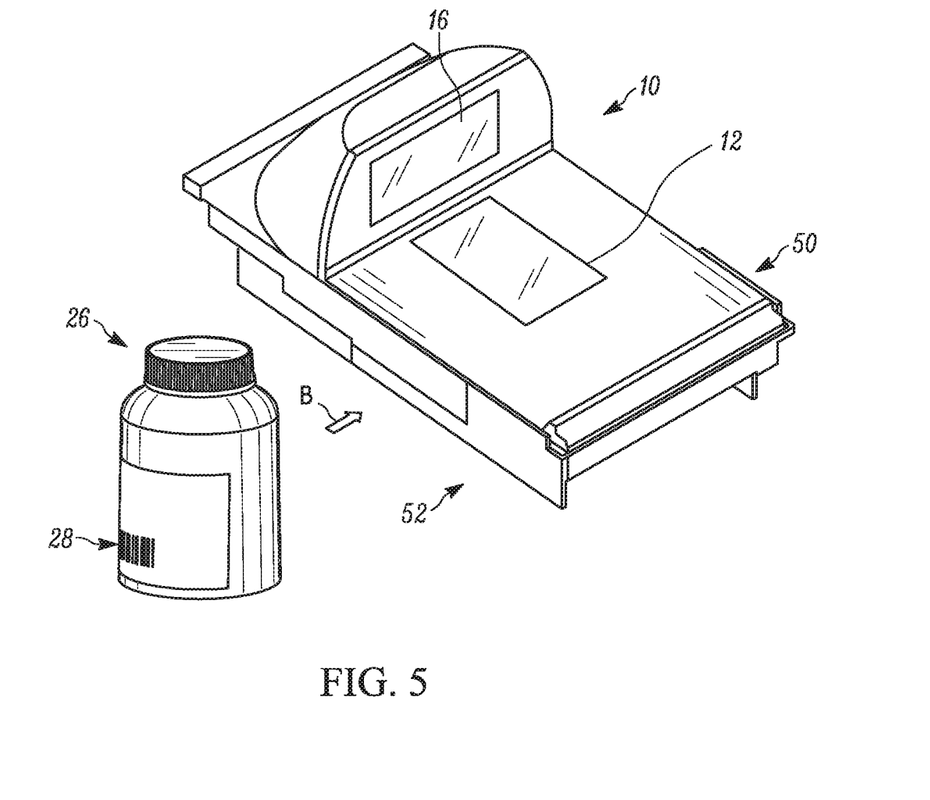
FIG. 5 is a perspective view of a product being removed from a transaction register in accordance with an embodiment of the present invention.

Referring now to FIGS. 4 and 5, the workstation 10 may be used to add products 26 to and remove products 26 from a transaction register prior to closing out that transaction. The workstation has a first side 50 and a second side 52. In operation, the user, (e.g., the clerk or customer) swipes the product 26 past the window 12 such that the UPC symbol 28 is read by the workstation imager(s) 30. Before, during, or after this process, the controller 44 determines the direction that the product 26 is/was swiped past the window 12.

As described above, in one embodiment, detection of direction may be achieved by the use object sensor(s) 56. In another embodiment, the controller 44 may be configured to evaluate a plurality of images taken by the workstation imager(s) 30 and determine the relative position of the UPC symbol 28 over a series of images taken over a period of time. For example, a detection of the UPC symbol 28 in a first image taken at time t, where the symbol is detected in a first location, and a detection of the UPC symbol 28 in a second image taken at time t+x, where the symbol is detected in a second location between the first location and the second side 52, can serve as an indicator that the UPC symbol 28 (along with the associated product 26) is being swiped in a first side 50 to second side 52 direction A. Similarly, other image analysis techniques may be used to determine the direction of movement of the UPC symbol 28 and/or product 26.

In yet another embodiment, the indicium on the product 26 may include a radio frequency (RF) identification (RFID) tag configured to be interrogated via an RFID reader and further configured to transmit data in response to the interrogation. In this case, detection of a product swipe direction may be achieved by providing one or more RFID antennas capable of detecting the presence of an RFID tag and a controller 44, operably connected to the one or more RFID antennas, configured to detect a relative location of the RFID tag over time. For example, a first RFID antenna can be positioned on a first side of the workstation 10 and a second RFID antenna can be positioned on a second side of the workstation. With such an arrangement, the initial detection of a product by the first RFID antenna followed by a subsequent detection of the product by the second RFID antenna could indicate a direction of movement from the first side to the second side of the workstation.

Those of ordinary skill will recognize that while the direction detection techniques have been described with reference to detecting movement from the first side 50 to the second side 52, the same techniques may be used to detect movement in the opposite direction. For example, with reference to the aforementioned image-based direction detection, a detection of the UPC symbol 28 in a first image taken at time t, where the symbol is detected in a first location, and a detection of the UPC symbol 28 in a second image taken at time t+x, where the symbol is detected in a second location between the first location and the first side 50, can serve as an indicator that the UPC symbol 28 (along with the associated product 26) is being swiped in a second side 52 to first side 50 direction B.

Upon the detection of the product swipe direction A/B, the controller 44 can responsively add/remove the product 26 to/from the transaction register. In one embodiment, a swipe of a product 26 in the direction A can be interpreted as a command to add the product 26 to the register. Furthermore, a swipe of a product 26 in the opposite direction B can be interpreted as a command to remove the product 26 from the register. For convenience, these directions may generally be referred to as an "addition direction" and a "removal direction." In another embodiment, the directions may be switched (i.e., direction A signals a removal and direction B signals an addition). In still yet another embodiment, the controller 44 may be configured to remove the product 26 from the register upon a detection of the indicium (and the product) being consecutively swiped in a removal direction more than one time in a given period of time. This may help avoid an undesired removal of a product from the register when a user unintentionally moves the product in a removal direction.

In yet another embodiment, the workstation 10 may be configured to output an alert when the product 26 is removed from the register. For example, the alert may include an audible noise, where that audible noise may be different than another audible noise outputted during the addition of a product. The alert may also include visual feedback. For instance, the visual feedback could be an activation of a colored beacon visible to the user or other employees in a retail space. Furthermore, the colored beacon could be selected to be different from another colored beacon generated during the addition of a product to the register. In another embodiment, the removal of a product could generate an alert (e.g., a message) at a terminal operated by a store employee. This configuration could be particularly useful in a self-checkout configuration where store employees generally oversee the checkout process that is performed by the customers. Since, in such a setting, store employees are not managing the checkout process directly, greater oversight of the transaction process, and in particular the removal of products from the transaction register, may result in less shrink events.

After finishing swiping all needed products past the workstation 10 and adding/removing all said products to/from the transaction register, the user can close out the transaction by paying for the items and leaving the retail venue.

Figure 6:
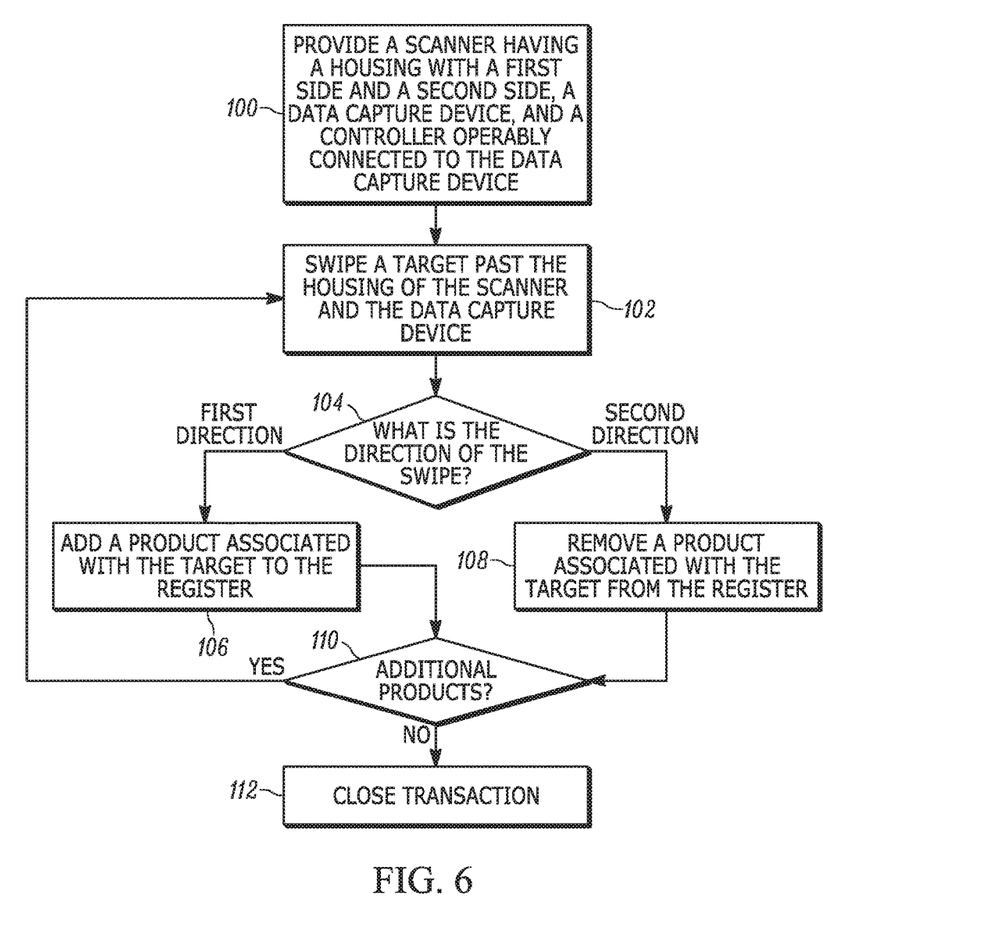
FIG. 6 is a flowchart representative of a method for compiling a register for processing a transaction in accordance with an embodiment of the present invention.

Referring now to FIG. 6, show therein is a flowchart representative of a method for compiling a register for processing a transaction in accordance with an embodiment of the present invention. In particular, step 100 includes providing a scanner having a housing with a first side and a second side, a data capture device therein, and a controller operably connected to the data capture device. In an embodiment, the first side of the housing is opposite to the second side of the housing, the data capture device is configured to capture data contained in a target being swiped past the housing, and the controller is operable to maintain the register and identify a direction of the target being swiped.

In step 102, a product is swiped past the housing of the scanner, and in step 104 the direction of the swipe is determined. If the controller determines that the swipe was in a first direction from the first side to the second side, then in step 106 a product that's associated with the target is added to the register. Alternatively, if the controller determines that the swipe was in a second direction from the second side to the first side, then in step 108 a product that's associated with the target is removed from the register. In an embodiment where the removal step 108 is initiated and the associated product is not present in the register, an optional alert (in a form of, for example, a visual beacon or a message on a display) may be provided. In an embodiment, the alert is configured to inform the user that no products have been remove and/or that no such products are in the register. After the addition 106 or removal 108, a check for additional products is made in step 110. If additional products remain, the method loops back to step 102. Otherwise, the transaction is closed and the customer is permitted to pay for the products/leave the venue.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A point of sale (POS) workstation comprising:
   a housing;
   a window supported by a portion of the housing, the portion having a first side and a second side, the first side being opposite to the second side;
   an imaging assembly within the housing, the imaging assembly configured to capture, through the window, at least one image of a target being swiped past the window; and
   a controller configured:
      identify the target;
      maintain a register;
      identify a direction of the target being swiped by detecting a first position of the target in a first image captured by the imaging assembly, detecting a second position of the target in a second image captured by the imaging assembly, the second image being taken later than the first image, and evaluating the second position relative to the first position and further relative to at least one of the first side or the second side;
      add an item associated with the target to the register in response to the direction being from the first side to the to the second side; and
      remove the item from the register in response to the direction being from the second side to the to the first side.

2. The POS workstation of claim 1, wherein the target is one of a one-dimensional barcode or a two-dimensional barcode.

3. The POS workstation of claim 1, wherein the controller is further configured to associate the direction being from the first side to the to the second side with the second position being between the first position and the second side.

4. The POS workstation of claim 1, wherein the controller is further configured to associate the direction being from the second side to the to the first side with the second position being between the first position and the first side.

5. A method of compiling a register for processing a transaction, the method comprising the steps of:
   providing a scanner having a housing with a first side and a second side, the first side being opposite to the second side;
   providing a data capture device within the housing, the data capture device being configured to capture data contained in a target being swiped past the housing, the target being a radio frequency (RF) identification (RFID) tag, the data capture device includes an RFID reader having a first antenna and a second antenna, the first antenna being positioned closer to the first side than the second antenna, the second antenna being positioned closer to the second side than the first antenna;

providing a controller operably connected to the data capture device, and operable to maintain the register and identify a direction of the target being swiped;

associating the first direction with the first antenna detecting the target at a first time and the second antenna detecting the target at a second time, the second time being later than the first time;

associating the second direction with the second antenna detecting the target at a first time and the first antenna detecting the target at a second time, the second time being later than the first time;

adding an item associated with the target to the register by swiping the target past the housing and the data capture device in a first direction from the first side to the second side; and removing the item from the register by swiping the target past the housing and the data capture device in a second direction from the second side to the first side.

6. The method of claim 5, further comprising: generating an alert upon the removing the item from the register.

7. The method of claim 6, further comprising: sending the alert to a terminal.

8. The method of claim 6, wherein the alert is at least one of auditory or visual.

9. A point of sale (POS) workstation comprising:

a housing;

a window supported by a portion of the housing, the portion having a first side and a second side, the first side being opposite to the second side;

an imaging assembly within the housing, the imaging assembly configured to capture, through the window, at least one image of a target being swiped past the window;

a first object sensor and a second object sensor, the first object sensor being positioned closer to the first side than the second object sensor, the second object sensor being positioned closer to the second side than the first object sensor; and a controller configured:

identify and detect the target within a field of view of the imaging assembly;

maintain a register;

identify a direction of the target being swiped;

associate the direction being from the first side to the to the second side with the second object sensor being triggered later than the first object sensor;

associate the direction being from the second side to the to the first side with the first object sensor being triggered later than the second object sensor;

add an item associated with the target to the register in response to the direction being from the first side to the to the second side; and remove the item from the register in response to the direction being from the second side to the to the first side.

* * * * *